Feb. 2, 1926. 1,571,680
J. F. O'CONNOR
CAR CONSTRUCTION
Filed Jan. 30, 1922

Witnesses
Wm. Geiger

Inventor
John F. O'Connor
By Geo. I. Haight
His Atty.

Patented Feb. 2, 1926.

1,571,680

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

CAR CONSTRUCTION.

Application filed January 30, 1922. Serial No. 532,617.

*To all whom it may concern:*

Be it known that I, JOHN F. O'CONNOR, a citizen of the United States, residing at Chicago, in the county of Cook and State of Illinois, have invented a certain new and useful Improvement in Car Construction, of which the following is a full, clear, concise, and exact description, reference being had to the accompanying drawings, forming a part of this specification.

This invention relates to improvements in car construction.

In the operation of railroads, experience has shown the advisability of so connecting the body and truck bolsters of a car that they cannot separate vertically in the event of collision or derailment since this effectually prevents or minimizes turning over or telescoping of the cars. Heretofore no especial difficulty has been experienced in applying proper bolster locking means to cars employing four-wheel trucks since ample space is available for the insertion and removal of the locking king pins. In the case of six-wheel trucks, however, and particularly dining, buffet and baggage cars, much difficulty has been encountered in designing a suitable bolster locking pin on account of the fact that the central axle of the six-wheel truck is located immediately below the pivotal center of the truck and access from above the bolster through the car floor is especially difficult.

The object of my invention is to provide an improved car construction, particularly for six-wheel trucks, wherein provision is made for effectively interlocking the body and truck bolsters to prevent vertical separation, at the same time allowing of easy disconnection of the truck from the car to facilitate repairs and the like.

A still further object of the invention is the provision of a car construction embodying the features above mentioned combined with means for effecting vertical adjustment of the car body with respect to the wheels and truck to compensate for variations occurring in manufacture, wear of the parts during service, and flexing of certain of the parts.

Figure 1:
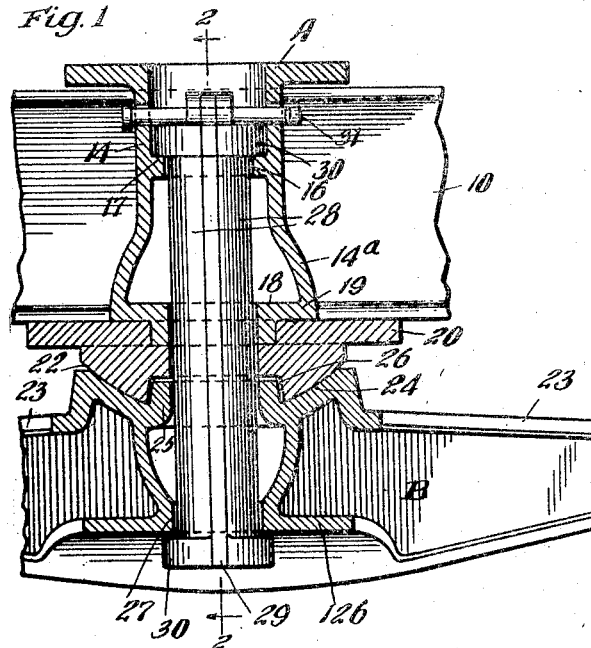
Figure 3:
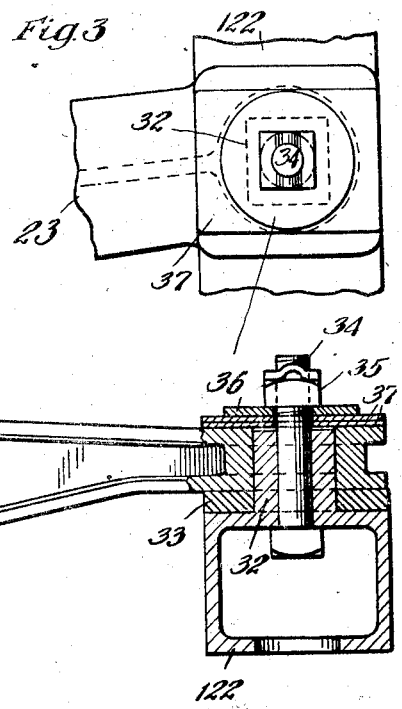
Figure 2:
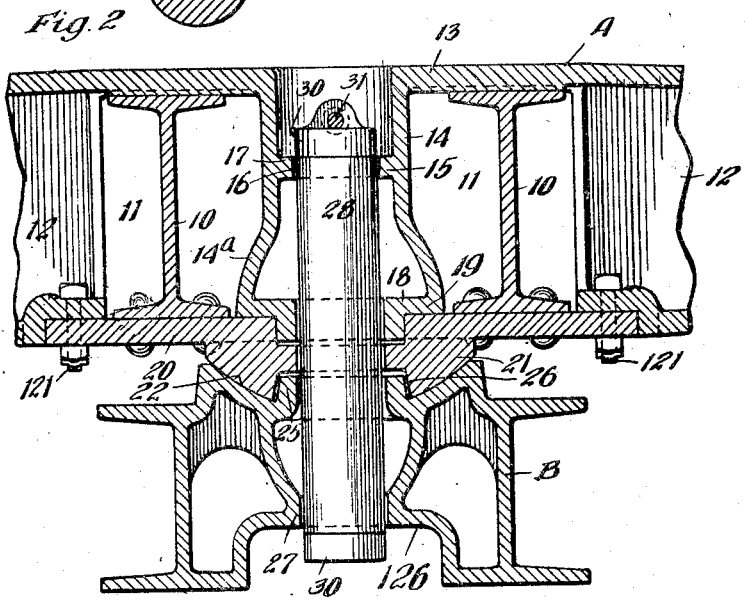

In the drawing forming a part of this specification, Figure 1 is a vertical, sectional view taken lengthwise of a car between the center sills through the bolster connection, and showing my improvements in connection therewith. Figure 2 is a vertical, sectional view, corresponding substantially to the section line 2—2 of Figure 1. And Figure 3 is a broken top plan view of a portion of the construction shown in Figure 1.

In said drawing, 10—10 denote longitudinally extending I-beam center sills of a car underframe, the same passing thru suitable openings 11 formed on the opposite sides of the center of a cast body bolster designated generally by the reference A. Said body bolster, as shown, has side diaphragms 12—12, a top web 13, and center section 14 to accommodate the king pin. Said central section 14, as shown, is of cylindrical form throughout the greater part of its length and is outwardly flared at the bottom as indicated at 14ª. Intermediate the top and bottom, said section 14 is provided with a transversely extending partition 15 which is centrally apertured as indicated at 16 and provides an upwardly facing annular shoulder as indicated at 17. At its bottom, the section 14 is provided with another partition or bottom wall 18 apertured centrally, to accommodate the king pin and having a depending annular flange 19 concentric with the aperture. The body bolster is completed by means of a separate bottom plate 20 suitably countersunk within the bottom of the casting and rigidly united thereto as by bolts 121. Said plate 20 is formed with a depending enlargement 21 having a spherical bottom face 22 which functions as the body bolster center bearing plate, the enlargement 21 being apertured to accommodate the king pin as will be understood.

In six-wheel trucks, it is customary to employ two transversely extending bolsters, each bolster being located between the central axle and one of the end axles and extending parallel thereto. Only one of such bolsters is indicated in the drawing, the same being referenced 122, it being understood that there will be a corresponding bolster on the opposite side of the king pin, as shown in Figure 1. To transfer the load of the car to the bolsters 122, it is customary to employ an arch of spider form, the same being indicated broadly by the reference B. Said arch B, as shown, consists of a casting having preferably four arms extending more or less radially from the center of the casting, one of said arms being shown and referenced 23. As will be understood by those skilled in the art, two of said arms are disposed on each side of the center and separate laterally so as to be supported at spaced points at their ends on the corresponding bolsters proper 122. The arch casting B, as shown, is formed at the center at the top thereof with a concave center bearing surface 24 conforming to the body bolster center bearing. The arch casting B is also preferably provided with an upstanding annular flange 25 which enters a corresponding recess 26 of slightly larger diameter provided on the under side of the enlargement 21 of the body bolster so as to allow for the usual turning movements of the truck and also accommodate the tilting of the truck with respect to the car body. The casting B is centrally apertured to accommodate the king pin and the bottom wall 126 provides a downwardly facing annular shoulder 27 surrounding the lower king pin opening, for the purpose hereinafter described.

The body bolster is interlocked with the truck bolsters through the intermediary of the arch B, preferably by the following described locking king pin. As shown, the king pin comprises two substantially semi-cylindrical outer sections 28—28 and a central spreader plate 29. Each of the outer sections 28 is formed at the top and bottom thereof with eccentric substantially semi-cylindrical outwardly extending flanges 30—30 which overlap the corresponding shoulders 17 and 27. The cross sections of the members 28 are made such that they may be inserted through the king pin openings when the plate 29 is not present and, after having been inserted, the plate 29 is interposed between them, thus separating the sections 28 and causing the same to lock with the bolsters as above indicated. Each of the sections 28 and the plate 29 is provided with an upstanding perforated ear through which is extended a retainer pin 31, the ends of the latter being supported in suitable sections of the body bolster casting A. With the arrangement shown, it is evident that the necessary turning movements of the truck with relation to the body are permitted, but that the body bolster cannot separate vertically from the arch casting B.

To provide for the vertical adjustment of the car body with respect to the truck and also to allow of the truck being removed from beneath the car body for inspection or repairs, I preferably employ the following arrangement, particular reference being had to Figures 1 and 3. At each point where an arm 23 of the arch bears upon the truck bolster proper 22, the latter is formed with an upstanding integral lug 32 of preferably non-circular cross section and the end of the arm 23 is provided with a corresponding aperture to fit snugly over the lug 32. A suitable hardened wear plate 33 is preferably applied on top of the bolster proper so as to avoid excessive wear of the bolster proper which is usually in the form of a casting and also to insure horizontal support for the end of the arch arm. The parts are held together by a suitable bolt 34 and nut 35, a washer 36 being employed beneath the nut. A plurality of shims 37 are also employed, said shims 37 being shown as interposed between the washer 36 and the top of the arm in which condition the body of the car will assume its lowest position with respect to the truck. To elevate the body of the car with respect to the truck, the necessary number of shims are removed from a point above the arm and the proper thickness of shims placed in position between the under side thereof and the bearing plate 33. Not only is the adjustment of the car body thus provided for, but it will also be evident that by simply disconnecting the ends of the four arms of the arch from the two truck bolsters proper 122, the car body can be jacked up and the truck removed from beneath the car.

I have herein shown and described what I now consider the preferred manner of carrying out the invention, but the same is merely illustrative and I contemplate all changes and modifications that come within the scope of the claims appended hereto.

I claim:

1. In a car construction, the combination with a body bolster; of a six-wheel truck bolster; an arch member having its ends adapted to be supported on said truck bolster; and shims adapted to be interposed between the ends of said arch member and said truck bolsters for adjusting the height of said arch member relative to said truck bolsters.

2. In car construction, the combination with a six-wheel truck provided with spaced truck bolsters; of a body bolster; an arch member detachably connected at the four corners thereof with said truck bolsters whereby said arch member may be disconnected from the truck bolster without disassembling the parts of the truck and without destructive effect; and a multiple-piece locking center pin pivotally connecting said arch member and body bolster, the parts of said locking center pin being insertable from the underside of said arch member when the latter is detached from the truck bolsters, and without the necessity of removing the center axle of the six-wheel truck.

3. In car construction, the combination with a body bolster; of six-wheel truck bolsters; an arch member having laterally extended arms supported at their ends on said truck bolsters; means for detachably but rigidly securing said ends of said arms to said truck bolsters; a center pin extended through said bolster and arch; and means adapted to be interposed between said ends and bolster for adjusting the height of said arch with respect to the truck bolsters.

4. In car construction, the combination with a body bolster; of six-wheel truck bolsters; an arch member having laterally extended arms supported on said truck bolsters; means for detachably but rigidly securing the ends of said arms to said truck bolsters; a safety locking center pin extending through said body bolster and arch preventing vertical separation thereof; and means at the ends of said arms for adjusting the height of said arch with respect to said truck bolsters.

5. In a car construction, the combination with a body bolster; of six-wheel truck bolsters having integral upstanding lugs; an arch member having laterally extended arms adapted to be supported at their ends upon said truck bolsters, said arms having openings therethrough to receive said lugs on the truck bolsters; a removable connecting member insertable through each of the lugs for detachably connecting the truck bolsters to the ends of said arch member; and shims adapted to be interposed between said truck bolsters and the ends of said arms for adjusting the height of said arch with respect to said truck bolsters.

In witness that I claim the foregoing I have hereunto subscribed my name this 10th day of January 1922.

JOHN F. O'CONNOR.